US011789947B2

(12) United States Patent
Desai et al.

(10) Patent No.: US 11,789,947 B2
(45) Date of Patent: Oct. 17, 2023

(54) INDEPENDENT OBJECT GENERATOR AND WRAPPER ENGINE (71) Applicant: Bank of America Corporation, Charlotte, NC (US)

(72) Inventors: Samir Kiranbhai Desai, Mumbai (IN); Dileep Umakant Verma, Ahmedabad (IN); Srikanth Vemula, Telangana (IN); Namrata Kurmi, Gautham Buddha Nagar (IN)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 17/317,013

(22) Filed: May 11, 2021

(65) Prior Publication Data
US 2022/0365929 A1 Nov. 17, 2022

(51) Int. Cl.
*G06F 16/248* (2019.01)
*G06F 16/2455* (2019.01)
*G06F 16/2452* (2019.01)
*G06F 16/955* (2019.01)

(52) U.S. Cl.
CPC ...... *G06F 16/24526* (2019.01); *G06F 16/248* (2019.01); *G06F 16/2455* (2019.01); *G06F 16/9566* (2019.01)

(58) Field of Classification Search
CPC ... G06F 16/116; G06F 16/1794; G06F 16/258
See application file for complete search history.

(56) References Cited

U.S. PATENT DOCUMENTS

| | | |
|---|---|---|
| 2001/0014976 A1 | 8/2001 | Roop et al. |
| 2003/0014442 A1 | 1/2003 | Shiigi et al. |
| 2003/0200256 A1 | 10/2003 | Hu et al. |
| 2004/0098498 A1 | 5/2004 | Mitra |
| 2004/0181792 A1 | 9/2004 | Barajas |
| 2004/0199400 A1 | 10/2004 | Lundberg |
| 2005/0108212 A1 | 5/2005 | Karimisetty et al. |
| 2005/0108536 A1 | 5/2005 | Karimisetty et al. |

(Continued)

OTHER PUBLICATIONS

Aykut Firat et al. "IWrap: Instant Web Wrapper Generator" http://web.mit.edu/smadnick/www/wp/2000-10.pdf Jun. 2000, pp. 1-9.

*Primary Examiner* — Robert W Beausoliel, Jr.
*Assistant Examiner* — Pedro J Santos
(74) *Attorney, Agent, or Firm* — Banner & Witcoff, Ltd.

(57) ABSTRACT

Aspects of the disclosure relate to a data wrapper engine. A computing platform may receive a query comprising a request for data stored as a CLOB. The computing platform may obtain, from a data storage system, the data stored as a CLOB. The computing platform may generate a file wrapper for the data, wherein generating the file wrapper comprises converting the CLOB to a VARCHAR object and storing the VARCHAR object in the file wrapper. The computing platform may generate, using the VARCHAR object stored in the file wrapper, a SQL response to the query. The computing platform may execute the dynamic SQL response to generate a response to the query. The computing platform may send, to a user device, the response to the query and commands directing the user device to display the response to the query, which may cause the user device to display the response.

20 Claims, 8 Drawing Sheets (56) References Cited

U.S. PATENT DOCUMENTS

| | | |
|---|---|---|
| 2005/0160101 A1* | 7/2005 | Gallagher ............. G06F 16/284 |
| 2005/0210009 A1 | 9/2005 | Tran |
| 2006/0106763 A1* | 5/2006 | Dirisala .............. G06F 16/2428 |
| 2006/0108404 A1 | 5/2006 | Seko |
| 2007/0124331 A1 | 5/2007 | Griffin |
| 2007/0162934 A1 | 7/2007 | Roop et al. |
| 2007/0239669 A1* | 10/2007 | Ordonez ........... G06F 16/24522 |
| 2008/0140696 A1* | 6/2008 | Mathuria ............ G06F 16/221 |
| | | 707/999.102 |
| 2009/0327946 A1 | 12/2009 | Stignani et al. |
| 2010/0186042 A1 | 7/2010 | Roop et al. |
| 2012/0084304 A1 | 4/2012 | Lusk et al. |
| 2013/0232221 A1 | 9/2013 | Brechner et al. |
| 2014/0122544 A1 | 5/2014 | Tran et al. |
| 2014/0310262 A1 | 10/2014 | Feinberg |
| 2014/0379636 A1* | 12/2014 | Lober ................... G06F 16/258 |
| | | 707/610 |
| 2015/0309998 A1 | 10/2015 | Perumanam et al. |
| 2015/0312379 A1 | 10/2015 | Lusk et al. |
| 2018/0225352 A1* | 8/2018 | Purushothaman .... G06F 16/278 |
| 2018/0314836 A1 | 11/2018 | Testerman |
| 2018/0314837 A1 | 11/2018 | Testerman |

\* cited by examiner

INDEPENDENT OBJECT GENERATOR AND WRAPPER ENGINE

BACKGROUND

Aspects of the disclosure relate to speech to data access and processing. In particular, one or more aspects of the disclosure relate to providing improved data access using independent object generation and wrapping.

In some instances, enterprise organizations and/or individuals may employ large data objects in front end applications. In some instances, however, the data size of such objects may exceed a size limit that may be supported by a single data table. In these instances, the physical separation of such data may result in inefficient access or retrieval of such data. Accordingly, it may be important to improve the storage of and/or access to such large data objects in a way that does not unduly burden computing resources and/or network bandwidth.

SUMMARY

Aspects of the disclosure provide effective, efficient, scalable, and convenient technical solutions that address and overcome the technical problems associated with data storage and processing for front end applications. In accordance with one or more embodiments of the disclosure, a computing platform comprising at least one processor, a communication interface, and memory storing computer-readable instructions may receive, from a user device, a query comprising a request for data stored as a character large object (CLOB). The computing platform may obtain, from a data storage system, the data stored as a CLOB. The computing platform may generate a file wrapper for the data, which may include converting the CLOB to a variable character field (VARCHAR) object and storing the VARCHAR object in the file wrapper. The computing platform may generate, using the VARCHAR object stored in the file wrapper, a dynamic structured query language (SQL) response to the query. The computing platform may execute the dynamic SQL response to generate a response to the query. The computing platform may send, to the user device, the response to the query and one or more commands directing the user device to display the response to the query, which may cause the user device to display the response to the query.

In one or more instances, the dynamic SQL response may include a reference to the VARCHAR object. In one or more instances, obtaining the data may include obtaining data stored across multiple tables.

In one or more instances, the request for the data may further request data stored as a national character large object (NCLOB). In one or more instances, generating the file wrapper may include embedding a uniform resource locator (URL) into the wrapper.

In one or more instances, a data size of the data stored as a CLOB may match the data size of the VARCHAR object and the file wrapper. In one or more instances, the query may include one or more data references to the data stored as a CLOB, and the dynamic SQL response might not include the one or more data references.

In one or more instances, the computing platform may identify whether or not the data already includes the file wrapper, and generating the file wrapper may be in response to identifying that the data does not already include the file wrapper.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure are directed to an independent object generator and wrapper engine. More specifically, database columns that include character large objects (CLOB) and national character large objects (NCLOB) may be widely used within front end applications to allow users to include free form descriptions of data pertaining to the applications domain. The data in such columns may be large and potentially run into gigabytes (GBs) depending on the database product feature. The front end application may use any database product for storing the data. While these types of columns are routine for any front end or online transaction processing application (OLTP), there may be challenges to handle in the data warehouse (e.g., poor performance and/or memory overflow errors).

When the size of the data goes beyond a certain limit, the data may be physically stored in different data pages across different tables. Due to the separate physical location of the data, there may be a large input/output (I/O) involved whenever such columns are queried. This may cause performance degradation of the database and the applications.

To address these deficiencies, described herein is a solution directed to an intelligent interface engine that generates objects to enable seamless data page rendering and maintaining of such pages throughout the lifecycle of large objects. The engine may be configured to detect large objects and corresponding attributes, and dynamically create references, along with appropriate wrappers, and model them for validation and execution. The engine may enable developers to work with the database objects without worrying about different data types. The engine may be capable of mimicking and creating a dynamic parser for every cluster of datasets.

As a result, a solution is presented that includes: 1) backend independent components with the ability to connect to any database product that has the metadata information and supports open database connectivity (ODBC)/java database connectivity (JDBC), 2) the ability to intelligently detect the tables with CLOB and NCLOB columns and create wrappers that may be used as alternatives to such tables and thereby prevent the performance and memory overflow issues, and 3) a safe query parser that detects any references to a table with CLOB and NCLOB columns, and dynamically tweaks queries to take advantage of the wrappers.

In some instances, the engine may provide an interface between an end user (e.g., a real interactive person or another program accessing the engine interface) and the physical database (any database product that has the metadata information and supports ODBC/JDBC).

A CLOB detector may store the query from the end user in memory, and also may have the ability to connect to the required database metadata. Using this information, the CLOB detector may detect the references of any tables that have CLOB/NCLOB columns in the submitted query. It may then generate the list of target tables that have such columns and may keep the list in the internal memory.

A wrapper checker may handle the list of all the target tables that need wrappers and it may route the flow to one of the following components (e.g., the safe query parser and/or wrapper creator based on the existence of all the needed wrappers). It may also check whether the wrapper covers all the columns of the respective tables as the database structure may change over the time.

Out of the target table list, if at least one wrapper does not exist or any column is missing from at least one wrapper, then a wrapper creator may take charge and create/update the required wrappers. It may convert the CLOB to VARCHAR and optionally add the URL attributes to view the CLOB content. At this point all the wrappers may be ready for all the target tables. It may then route the control to a safe query parser component.

If all the wrappers exist with all the columns for all the target tables, then the control may be routed to this component. It may then dynamically tweak the original query and replace all the references of the target physical tables with respective wrappers, validate the dynamic query, and store the dynamic query in memory.

A SQL executor may then execute the dynamically tweaked query. The output may be returned to the end user. This result might not need to have any CLOB/NCLOB data, so it may prevent performance and memory overflow issues associated with such columns.

The wrapper for a target table may have all the columns of the table, but with first n characters values of CLOB/NCLOB to variable character field (VARCHAR) data type. The number of n character values may be configurable. The wrapper may also provide additional uniform resource locator (URL) attributes. URL attributes may be returned if opted so as to give an option to the user to view the full CLOB/NCLOB data using the record level URL.

Figure 1A:
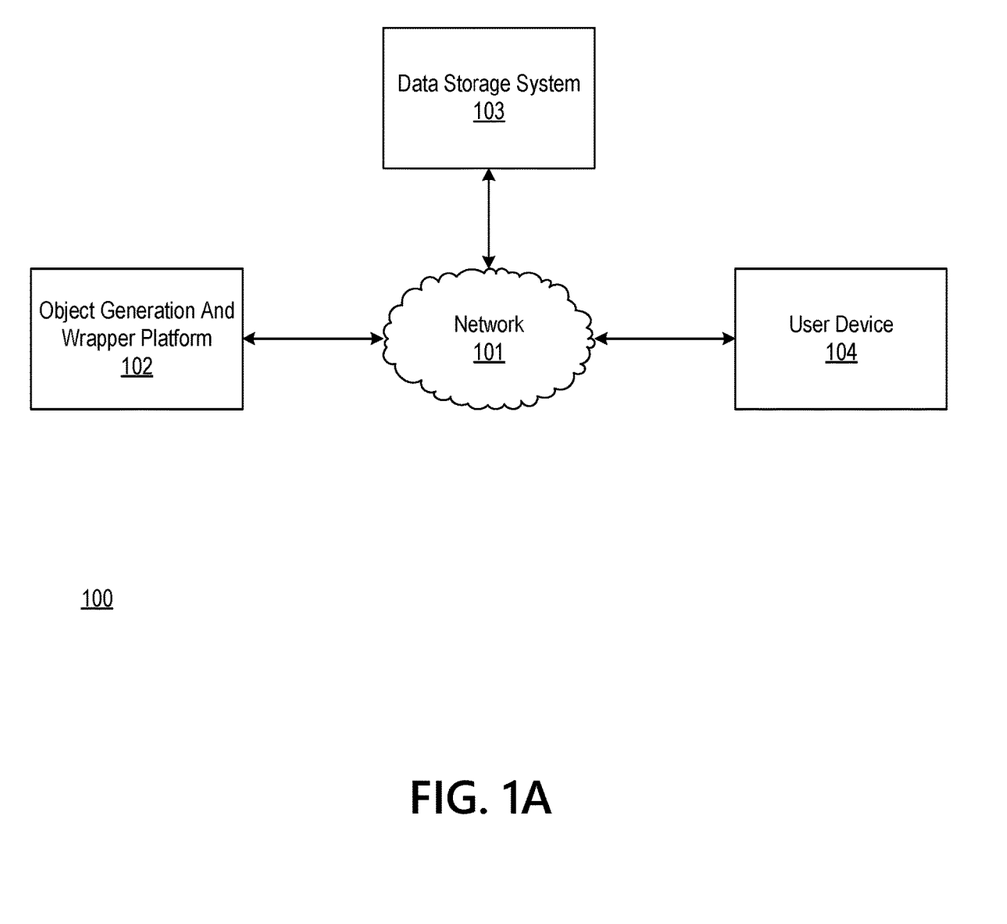
FIGS. 1A-1B depict an illustrative computing environment for independent object generation and wrapping in accordance with one or more example embodiments.
Figure 1B:
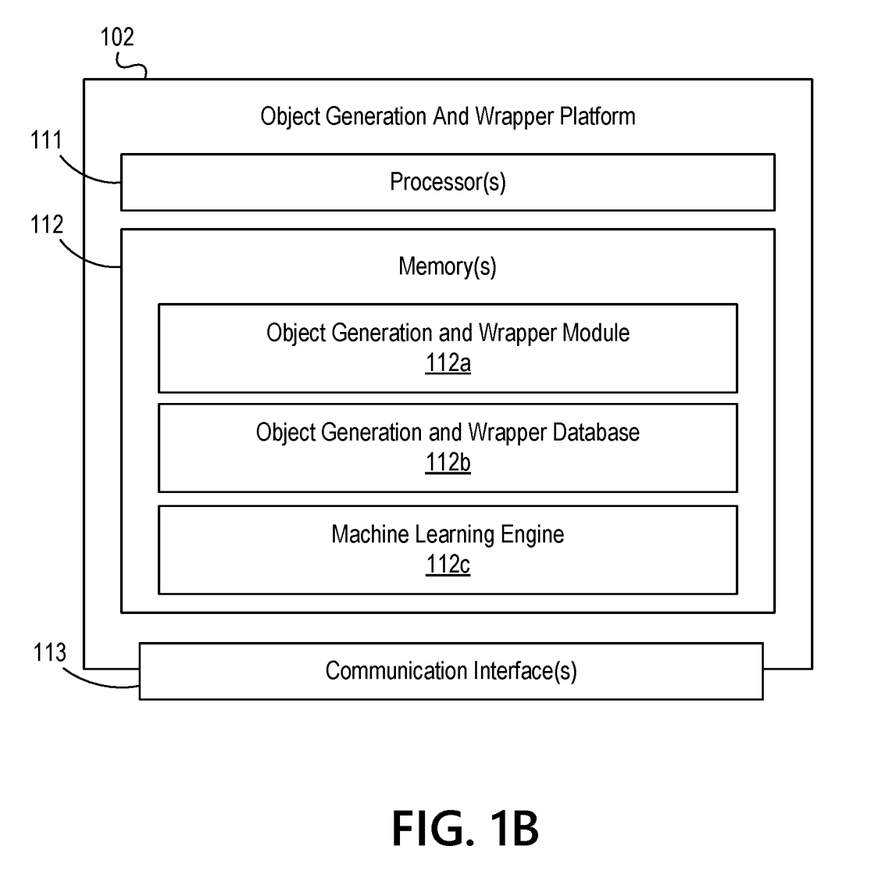

FIGS. 1A-1B depict an illustrative computing environment for independent object generation and wrapping in accordance with one or more example embodiments. Referring to FIG. 1A, computing environment 100 may include one or more computer systems. For example, computing environment 100 may include object generation and wrapper platform 102, data storage system 103, and user device 104.

As described further below, object generation and wrapper platform 102 may be a computer system that includes one or more computing devices (e.g., servers, server blades, or the like) and/or other computer components (e.g., processors, memories, communication interfaces) that may be implement one or more object generation and/or wrapping techniques that may be used for query processing.

Data storage system 103 may include one or more computing devices (e.g., servers, server blades, or the like) and/or other computer components (e.g., processors, memories, communication interfaces) that may be used to store application data that accessed in execution of one or more front end applications and/or in backend modifications made to the front end applications. In one or more instances, the data storage system 103 may support open database connectivity (ODBC), java database connectivity, and/or other services.

User device 104 may be a laptop computer, desktop computer, mobile device, tablet, smartphone, or the like that may be used by an employee or customer of an enterprise organization (e.g., a financial institution, or the like). For example, the user device 104 may be used by one or more individuals to access, execute, or otherwise modify one or more front end applications. In some instances, user device 104 may be configured to display one or more user interfaces (e.g., data management interfaces, and/or other interfaces).

Computing environment 100 also may include one or more networks, which may interconnect object generation and wrapper platform 102, data storage system 103, and/or user device 104. For example, computing environment 100 may include a network 101 (which may interconnect, e.g., object generation and wrapper platform 102, data storage system 103, user device 104).

In one or more arrangements, object generation and wrapper platform 102, data storage system 103, and/or user device 104 may be any type of computing device capable of sending and/or receiving requests and processing the requests accordingly. For example, object generation and wrapper platform 102, data storage system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of object generation and wrapper platform 102, data storage system 103, and/or user device 104, may, in some instances, be special-purpose computing devices configured to perform specific functions.

Referring to FIG. 1B, object generation and wrapper platform 102 may include one or more processors 111, memory 112, and communication interface 113. A data bus may interconnect processor 111, memory 112, and communication interface 113. Communication interface 113 may be a network interface configured to support communication between object generation and wrapper platform 102 and one or more networks (e.g., network 101, or the like). Memory 112 may include one or more program modules having instructions that when executed by processor 111 cause object generation and wrapper platform 102 to perform one or more functions described herein and/or one or more databases that may store and/or otherwise maintain information which may be used by such program modules and/or processor 111. In some instances, the one or more program modules and/or databases may be stored by and/or maintained in different memory units of object generation and wrapper platform 102 and/or by different computing devices that may form and/or otherwise make up object generation and wrapper platform 102. For example, memory 112 may have, host, store, and/or include object generation and wrapper module 112*a*, object generation and wrapper database 112*b*, and machine learning engine 112*c*.

Object generation and wrapper module 112*a* may have instructions that direct and/or cause object generation and wrapper to execute advanced object generation and data wrapping techniques. Object generation and wrapper database 112*b* may store information used by object generation and wrapper module 112*a* and/or object generation and wrapper platform 102 in application of advanced object generation and data wrapping techniques, and/or in performing other functions. Machine learning engine 112*c* may have instructions that direct and/or cause the object generation and wrapper platform 102 to set, define, and/or iteratively refine optimization rules and/or other parameters used by the object generation and wrapper platform 102 and/or other systems in computing environment 100.

Figure 2A:
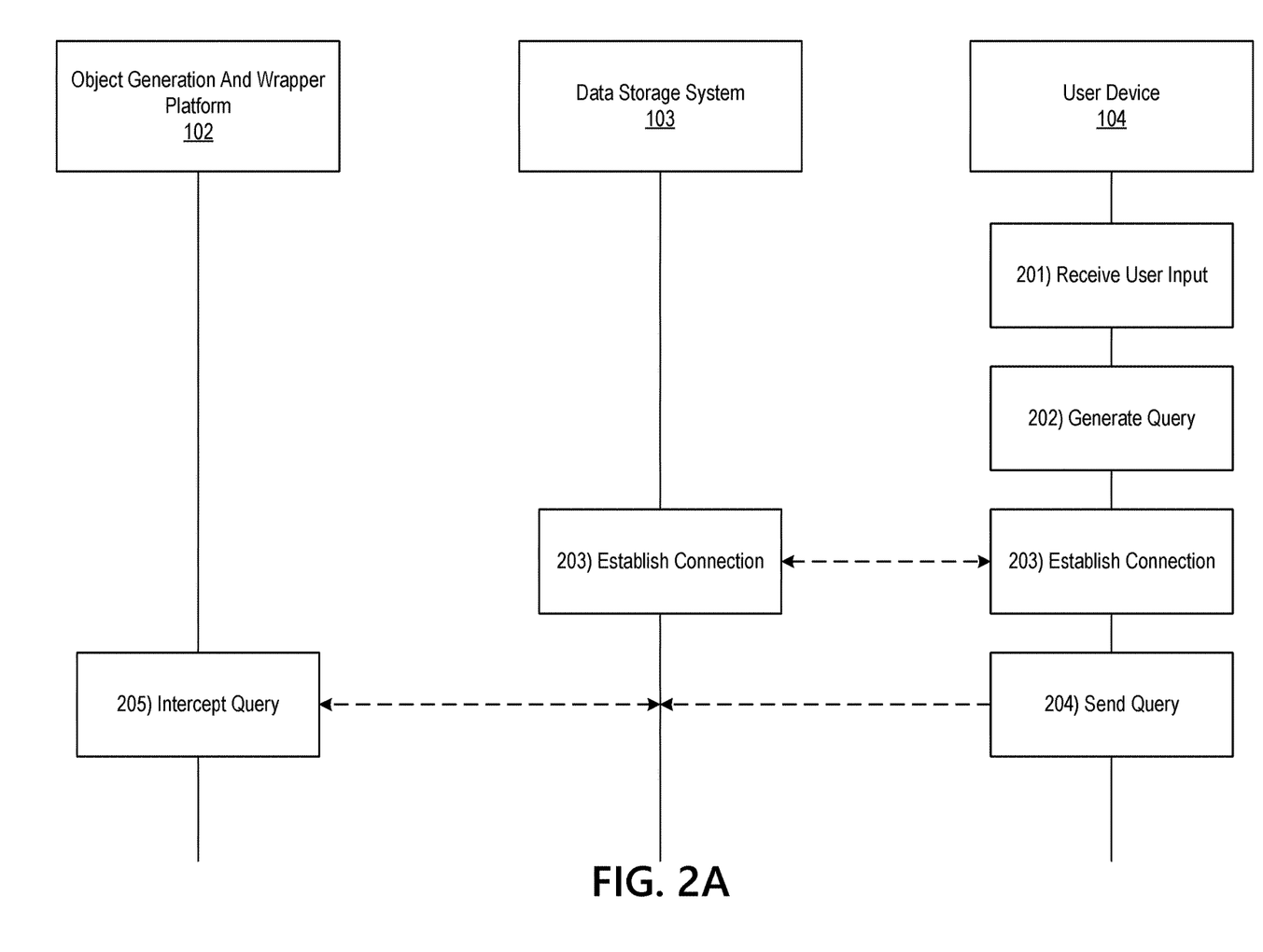
FIGS. 2A-2D depict an illustrative event sequence for independent object generation and wrapping in accordance with one or more example embodiments.

FIGS. 2A-2D depict an illustrative event sequence for independent object generation and wrapping in accordance with one or more example embodiments. Referring to FIG. 2A, at step 201, the user device 104 may receive a user input. For example, the user device 104 may receive a user input from an administrative user, who may be requesting to update, copy, and/or otherwise modify data supporting a front end application.

At step 202, the user device 104 may generate a query based on the user input. For example, the user device 104 may generate a query requesting to copy or otherwise access data stored in a data storage system (e.g., data storage system 103).

At step 203, the user device 104 may establish a connection with the data storage system 103. For example, the user device 104 may establish a first wireless data connection with the data storage system 103 to link the user device 104 with the data storage system 103 (e.g., in preparation for sending the query generated at step 202). In some instances, the user device 104 may identify whether or not a connection is already established with the data storage system 103. If a connection is already established with the data storage system 103, the user device 104 might not re-establish the connection. If a connection is not yet established with the data storage system 103, the user device 104 may establish the first wireless data connection as described herein.

At step 204, the user device 104 may send the query to the data storage system 103. For example, the user device 104 may send the query to the data storage system 103 while the first wireless data connection is established.

At step 205, the object generation and wrapper platform 102 may intercept the query sent at step 204 (e.g., before it is received at the data storage system 103. For example, in some instances, the object generation and wrapper platform 102 may be integrated into or otherwise include the data storage system 103, and may serve as an optimization layer for queries coming into the data storage system 103. In other instances, the object generation and wrapper platform 102 may be separate from the data storage system 103, but may be configured to intercept communications (e.g., queries) coming into the data storage system 103.

Figure 2B:
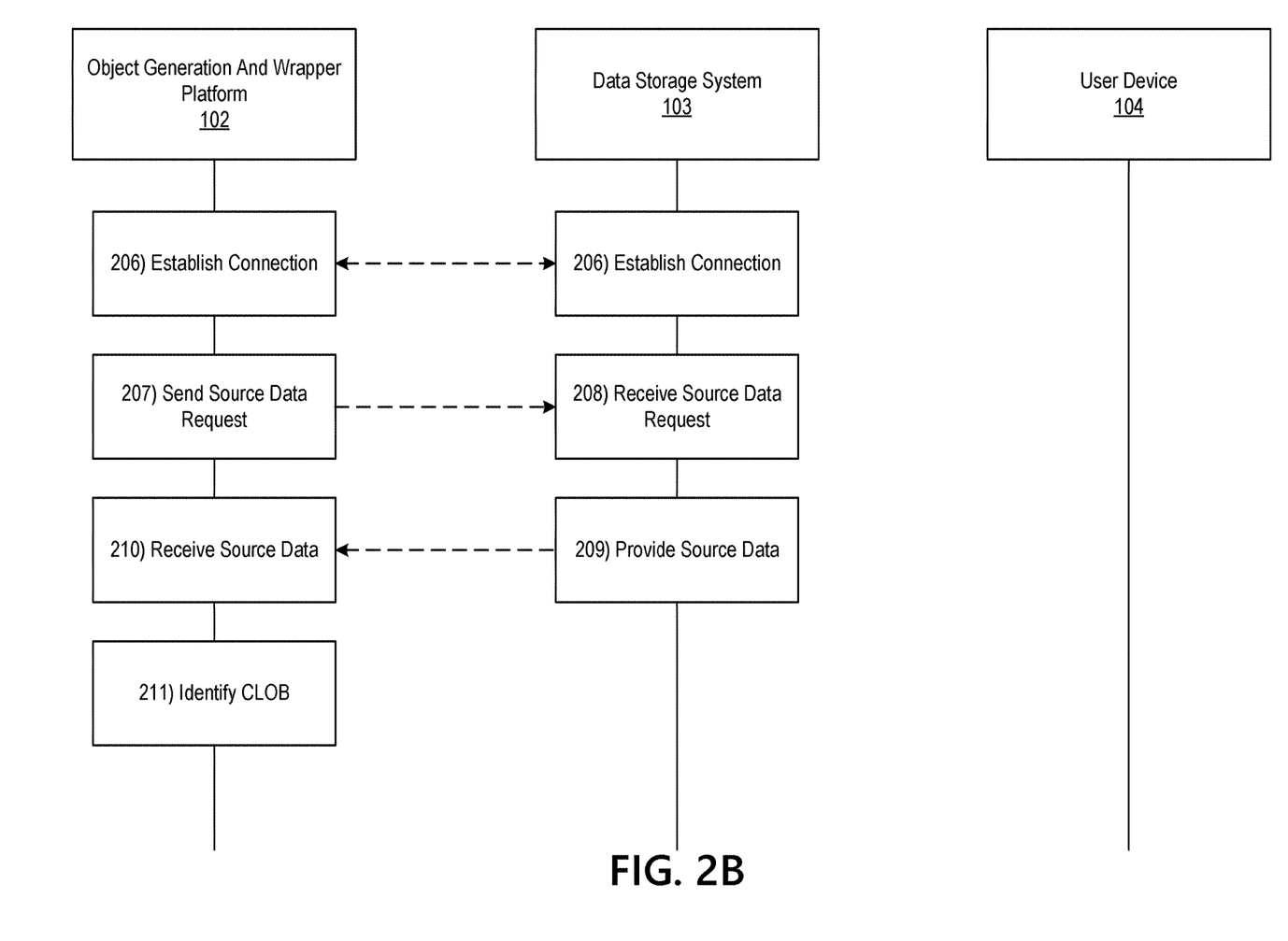

Referring to FIG. 2B, at step 206, the object generation and wrapper platform 102 may establish a connection with the data storage system 103. For example, the object generation and wrapper platform 102 may establish a second wireless data connection with the data storage system 103 to link the object generation and wrapper platform 102 with the data storage system 103 (e.g., in preparation for sending a source data requested). In some instances, the object generation and wrapper platform 102 may identify whether or not a connection is already established with the data storage system 103. If a connection is already established with the data storage system 103, the object generation and wrapper platform 102 might not re-establish the connection. If a connection is not yet established with the data storage system 103, the object generation and wrapper platform 102 may establish the second wireless data connection as described herein.

At step 207, the object generation and wrapper platform 102 may send a request to the data storage system 103 for source data requested by the user device 104 (e.g., via the query). For example, the object generation and wrapper platform 102 may send the request to the data storage system 103 via the communication interface 113 and while the second wireless data connection is established.

At step 208, the data storage system 103 may receive the source data request sent at step 208. For example, the data storage system 103 may receive the source data request while the second wireless data connection is established.

At step 209, the data storage system 103 may identify source data corresponding to the source data request, and may send the source data to the object generation and wrapper platform 102. In some instances, in sending the source data to the object generation and wrapper platform 102, the data storage system 103 may provide one or more data objects such as CLOB, NCLOB, and/or other large data object (e.g., a data object exceeding 1 gigabyte). In these instances, the source data may be stored across multiple data columns. In some instances, the data storage system 103 may include one or more storage devices, which may, in some instances, store source data of varied data sizes, and thus the source data may be sent from one or more data sources. In some instances, the data storage system 103 may send the source data to the object generation and wrapper platform 102 while the second wireless data connection is established.

At step 210, the object generation and wrapper platform 102 may receive the source data sent at step 209. For example, the object generation and wrapper platform 102 may receive the source data via the communication interface 113 and while the second wireless data connection is established.

At step 211, the object generation and wrapper platform 102 may identify whether or not the source data received at step 210 includes one or more CLOBs, NCLOBs, and/or other large data objects. If the object generation and wrapper platform 102 determines that the source data does not include one or more CLOBs, NCLOBs, and/or other large data objects, the object generation and wrapper platform 102 and/or data storage system 103 may respond to the query using the source data, and the method may otherwise end. If the object generation and wrapper platform 102 determines that the source data does include one or more CLOBs, NCLOBs, and/or other large data objects, the object generation and wrapper platform 102 may proceed to step 212. In some instances, the object generation and wrapper platform 102 may perform steps 205-211 using a CLOBs detector that is part of the object generation and wrapper platform 102.

In some instances, rather than requesting the source data from the data storage system 103 and identifying whether or not it includes CLOB/NCLOB as described above at steps 207-211, the object generation and wrapper platform 102 may use a CLOB detector to connect to metadata of the data storage system. In these instances, the object generation and wrapper platform 102 may use the metadata and the query to detect references of any tables (e.g., of the source data) that include CLOB/NCLOB columns within the query. In these instances, the object generation and wrapper platform 102 may then generate a list of target tables (e.g., that include such CLOB/NCLOB columns), and may maintain such a list in memory.

Figure 2C:
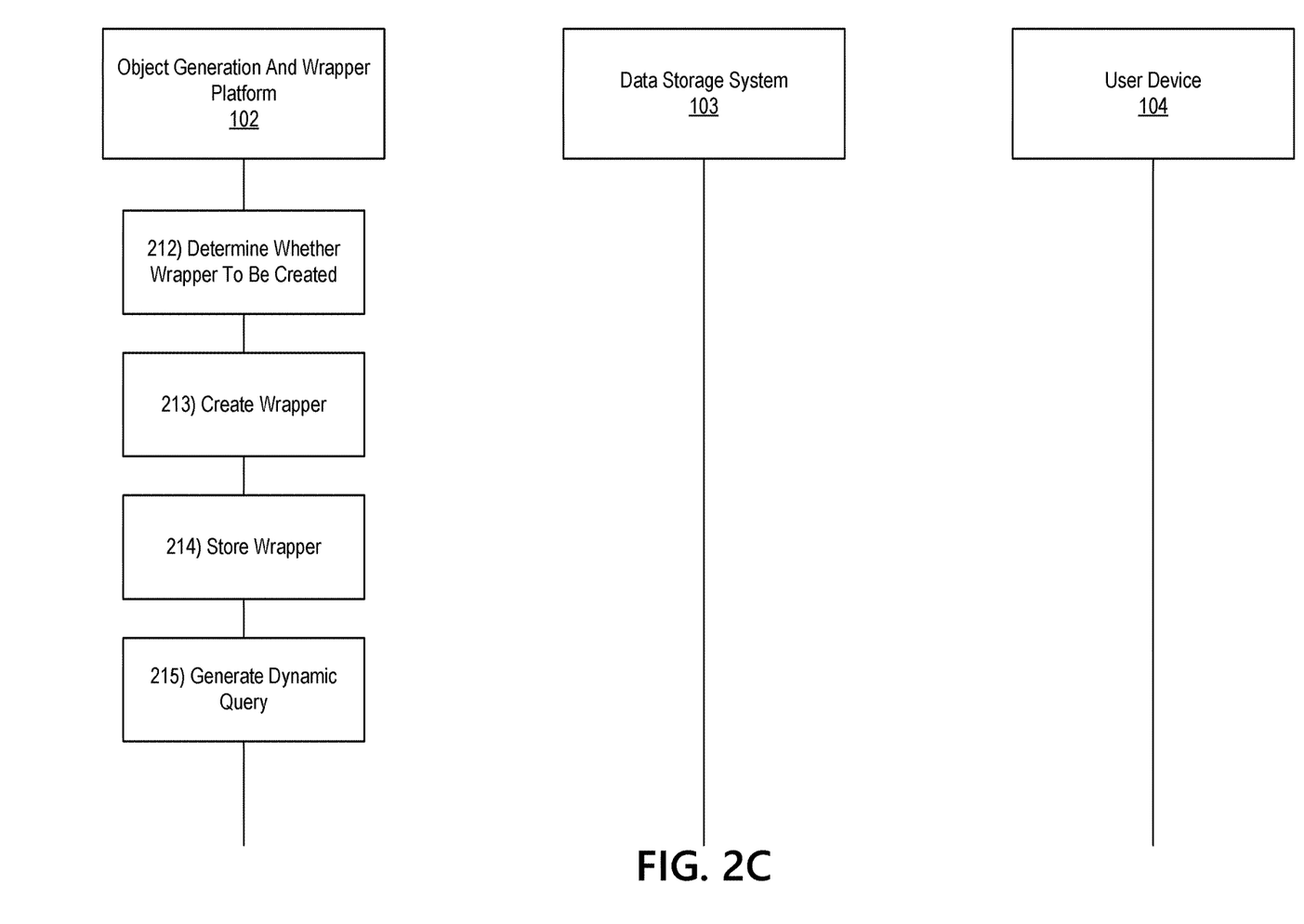

Referring to FIG. 2C, at step 212, the object generation and wrapper platform 102 may determine whether or not a wrapper should be generated for the CLOB, NCLOB, and/or other large data objects (e.g., based on the list of target tables and/or the source data). For example, the object generation and wrapper platform 102 may identify if a file wrapper is available for all columns of the source data. If the object generation and wrapper platform 102 identifies that a wrapper is available for all columns for the source data, the object generation and wrapper platform 102 may proceed to step 215. In these instances, however, prior to proceeding to step 215, the object generation and wrapper platform 102 may verify that existing wrappers cover all columns of their respective tables, which may be a dynamic process as the database structure may change over time. In instances where the existing wrappers do cover all columns, the object generation and wrapper platform 102 may proceed to step 215 as described above. However, if the object generation and wrapper platform 102 identifies that an existing wrapper does not cover all columns, the object generation and wrapper platform 102 may proceed to step 213 to generate a new wrapper.

If the object generation and wrapper platform 102 identifies that a wrapper is not available for all columns of the source data, the object generation and wrapper platform 102 may proceed to step 213. In some instances, the object generation and wrapper platform 102 may perform step 212 using an integrated wrapper checker.

At step 213, the object generation and wrapper platform 102 may create a wrapper (either create a new wrapper or update an old wrapper) for the source data. For example, the object generation and wrapper platform 102 may convert the CLOBs, NCLOBs, and/or other large data objects to VARCHAR objects. In doing so, the object generation and wrapper platform 102 may reduce the data size of the source data. In some instances, in creating the wrapper, the object generation and wrapper platform 102 may embed a uniform resource locator (URL), in the wrapper (which may, in some instances, point to the VARCHAR objects). For example, in these instances, the URL may include attributes to view the CLOB content (e.g., which may enable a user to view CLOB/NCLOB data using the record level URL). In some instances, in generating the wrapper, the object generation and wrapper platform 102 may generate a wrapper that comprises a data size equal to the difference between the VARCHAR objects and the CLOBs, NCLOBs, and/or other large data objects corresponding to the source data (e.g., so the wrapper and the VARCHAR objects, in combination, have a data size equivalent to that of the CLOBs, NCLOBs, and/or other large data objects). In some instances, in generating the wrapper(s), the object generation and wrapper platform 102 may include all columns of a target table, but may include may converting a number N of characters from CLOB/NCLOB to VARCHAR data type. In these instances, the number N may be configurable (e.g., by a user and/or automatically based on a predetermined time period or other interval). Once the object generation and wrapper platform 102 has generated wrappers for all target tables (e.g., based on the source data and/or the list), the object generation and wrapper platform 102 may proceed to step 214.

At step 214, the object generation and wrapper platform 102 may save the wrapper, created at step 213, in memory. In some instances, the object generation and wrapper platform 102 may perform steps 213 and 214 using an embedded wrapper creator. By storing the wrapper, the object generation and wrapper platform 102 may maintain the wrapper through the lifecycle of the corresponding source data, which may enable seamless data page rendering in response to future queries for the source data.

At step 215, the object generation and wrapper platform 102 may generate a dynamic query using the VARCHAR objects and the wrapper. For example, the object generation and wrapper platform 102 may use identify the VARCHAR objects corresponding to the query, and may use these VARCHAR objects and the wrapper to generate a dynamic SQL query. In these instances, the object generation and wrapper platform 102 may generate the dynamic SQL query by replacing references, in the original query, to the target physical tables with corresponding wrappers. In some instances, the object generation and wrapper platform 102 may validate or otherwise verify the dynamic SQL query, and may then store the dynamic SQL query for subsequent execution. In some instances, the object generation and wrapper platform 102 may generate the dynamic query using an integrated safe query parser.

Figure 2D:
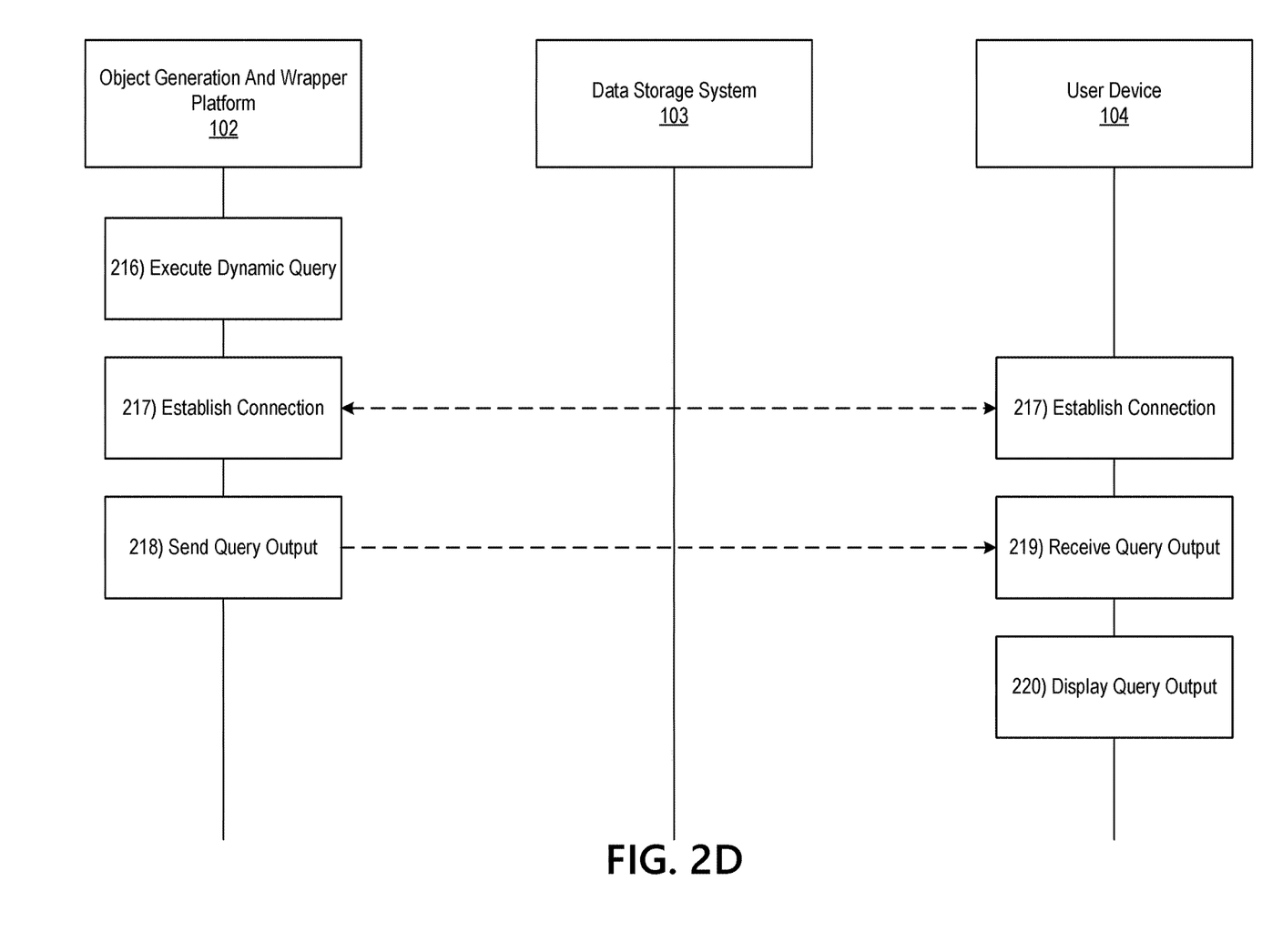

Referring to FIG. 2D, at step 216, the object generation and wrapper platform 102 may execute the dynamic SQL query generated at step 215. In doing so, the object generation and wrapper platform 102 may produce a data output that responds to the query. For example, the object generation and wrapper platform 102 may copy and/or otherwise produce requested source data. In these instances, the object generation and wrapper platform 102 may produce a data output that includes the VARCHAR data objects.

At step 217, the object generation and wrapper platform 102 may establish a connection with the user device 104. For example, the object generation and wrapper platform 102 may establish a third wireless data connection with the user device 104 to link the object generation and wrapper platform 102 to the user device 104 (e.g., in preparation for sending a query output). In some instances, the object generation and wrapper platform 102 may identify whether or not a connection is already established with the user device 104. If a connection is already established with the user device 104, the object generation and wrapper platform 102 might not re-establish the connection. If a connection is not established with the user device 104, the object generation and wrapper platform 102 may establish the third wireless data connection as described herein.

At step 218, the object generation and wrapper platform 102 may send the query output, generated at step 216. For example, the object generation and wrapper platform 102 may send the query output to the user device 104 via the communication interface 113 and while the third wireless data connection is established. In some instances, along with the query output, the user device 104 may send one or more commands directing the user device 104 to display a query output interface. In sending the query output, the object generation and wrapper platform 102 might not send any CLOB, NCLOB, and/or other large data objects, and thus may prevent performance and/or memory overflow issues associated with such columns.

At step 219, the user device 104 may receive the query output sent at step 218. For example, the user device 104 may receive the query output while the third wireless data connection is established. In some instances, along with the query output, the user device 104 may receive the one or more commands directing the user device 104 to display a query output interface.

Figure 4:
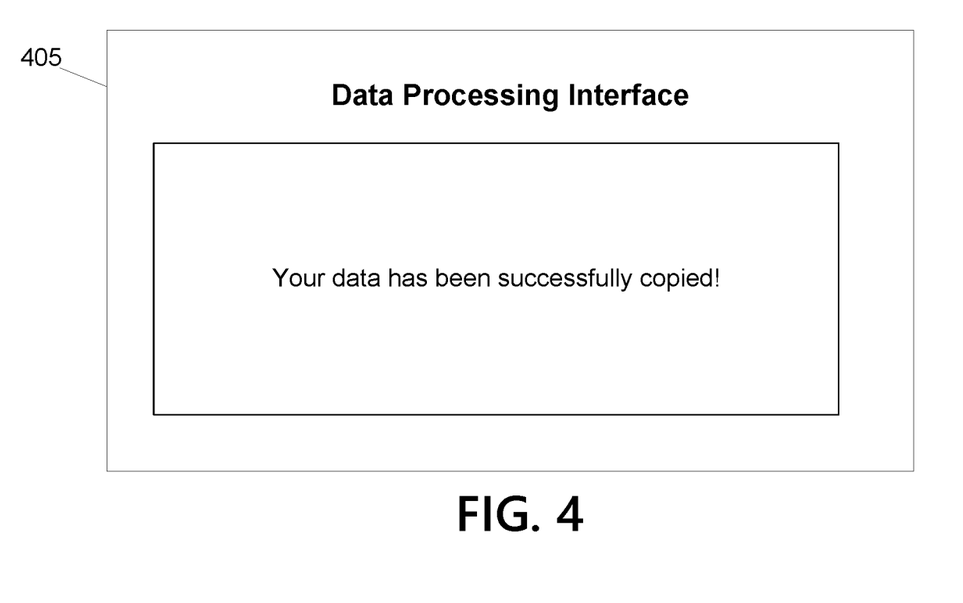
FIG. 4 depicts an illustrative graphical user interface for independent object generation and wrapping in accordance with one or more example embodiments.

At step 220, based on or in response to the one or more commands directing the user device 104 to display the query output interface, the user device 104 may display the query output interface. For example, the user device 104 may display a graphical user interface similar to graphical user interface 405, which is shown in FIG. 4, which may indicate, for example, that requested source data has been successfully copied.

Figure 3:
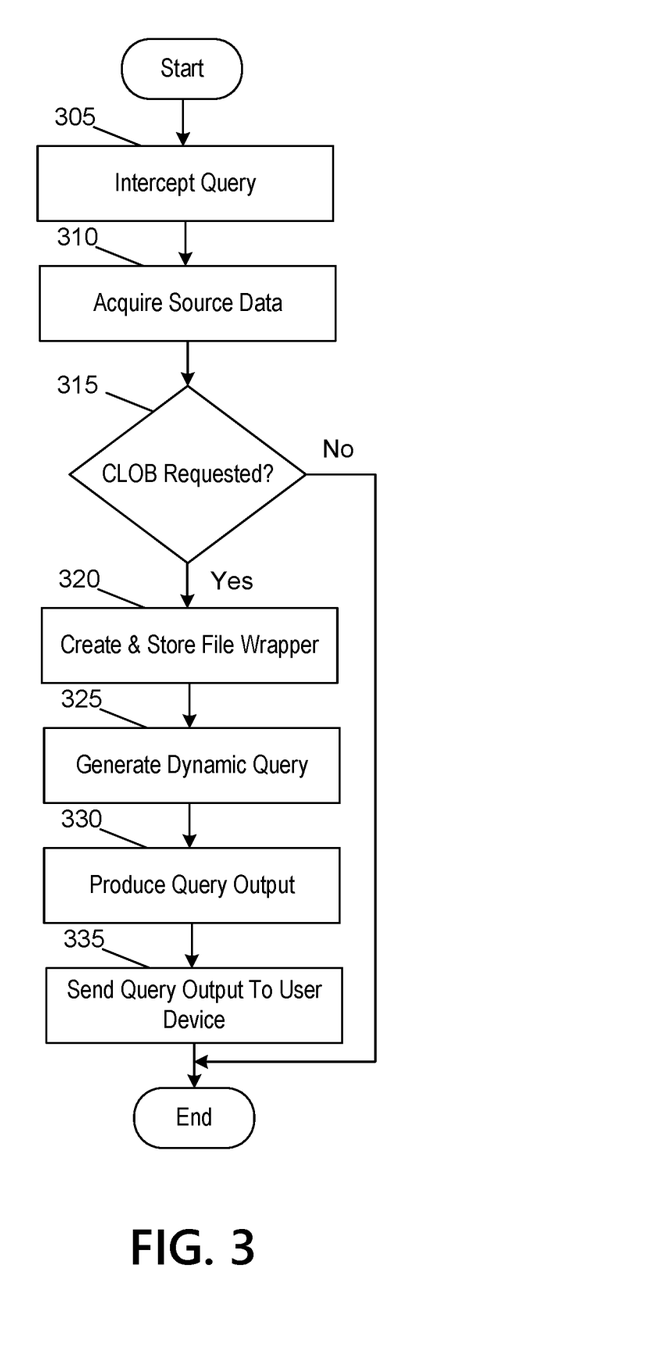
FIG. 3 depicts an illustrative method for independent object generation and wrapping in accordance with one or more example embodiments.

FIG. 3 depicts an illustrative method for independent object generation and wrapping in accordance with one or more example embodiments. Referring to FIG. 3, at step 305, a computing platform having at least one processor, a communication interface, and memory may intercept a query. At step 310, the computing platform may acquire the source data requested by the query. At step 315, the computing platform may identify whether or not the source data includes CLOB, SCLOB, and/or any other large data objects. If not, the method may end, and the query may be otherwise resolved. If so, the computing platform may proceed step 320.

At step 320, the computing platform may create and store a file wrapper corresponding to the source data. At step 325, the computing platform may generate a dynamic query that includes the file wrapper. At step 330, the computing platform may produce a query output using the dynamic query. At step 335, the computing platform may send the query output and one or more commands directing a user device to display the query output.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
   receive, from a user device, a query comprising a request for data stored as a character large object (CLOB);
   obtain, from a data storage system, the data stored as a CLOB;
   generate a file wrapper for the data, wherein generating the file wrapper comprises converting the CLOB to a variable character field (VARCHAR) object and storing the VARCHAR object in the file wrapper, wherein the file wrapper comprises a first data size, the CLOB comprises a second data size, and the VARCHAR object comprises a third data size, and wherein the first data size is equal to a difference between the second data size and the third data size;
   generate, using the VARCHAR object stored in the file wrapper, a dynamic structured query language (SQL) response to the query;
   execute the dynamic SQL response to generate a response to the query; and send, to the user device, the response to the query and one or more commands directing the user device to display the response to the query, wherein sending the one or more commands directing the user device to display the response to the query causes the user device to display the response to the query.

2. The computing platform of claim 1, wherein the dynamic SQL response includes a reference to the VARCHAR object.

3. The computing platform of claim 1, wherein obtaining the data comprises obtaining data stored across multiple tables.

4. The computing platform of claim 1, wherein the request for the data further requests data stored as a national character large object (NCLOB).

5. The computing platform of claim 1, wherein generating the file wrapper comprises embedding a uniform resource locator (URL) into the file wrapper.

6. The computing platform of claim 1, wherein a data size of the data stored as a CLOB matches the data size of the VARCHAR object and the file wrapper.

7. The computing platform of claim 1, wherein the query includes one or more data references to the data stored as a CLOB, and wherein the dynamic SQL response does not include the one or more data references.

8. The computing platform of claim 1, wherein the memory stores additional computer-readable instructions that, when executed by the at least one processor, cause the computing platform to:
identify whether or not the data already includes the file wrapper, wherein generating the file wrapper is in response to identifying that the data does not already include the file wrapper.

9. The computing platform of claim 1, wherein generating the file wrapper comprises converting a number N of characters of the CLOB to a VARCHAR data type, wherein N is configured based on a predetermined time period.

10. A method comprising:
at a computing platform comprising at least one processor, a communication interface, and memory:
receiving, from a user device, a query comprising a request for data stored as a character large object (CLOB);
obtaining, from a data storage system, the data stored as a CLOB;
generating a file wrapper for the data, wherein generating the file wrapper comprises converting the CLOB to a variable character field (VARCHAR) object and storing the VARCHAR object in the file wrapper;
generating, using the VARCHAR object stored in the file wrapper, a dynamic structured query language (SQL) response to the query, wherein the file wrapper comprises a first data size, the CLOB comprises a second data size, and the VARCHAR object comprises a third data size, and wherein the first data size is equal to a difference between the second data size and the third data size;
executing the dynamic SQL response to generate a response to the query; and
sending, to the user device, the response to the query and one or more commands directing the user device to display the response to the query, wherein sending the one or more commands directing the user device to display the response to the query causes the user device to display the response to the query.

11. The method of claim 10, wherein the dynamic SQL response includes a reference to the VARCHAR object.

12. The method of claim 10, wherein obtaining the data comprises obtaining data stored across multiple tables.

13. The method of claim 10, wherein the request for the data further requests data stored as a national character large object (NCLOB).

14. The method of claim 10, wherein generating the file wrapper comprises embedding a uniform resource locator (URL) into the file wrapper.

15. The method of claim 10, wherein a data size of the data stored as a CLOB matches the data size of the VARCHAR object and the file wrapper.

16. The method of claim 10, wherein the query includes one or more data references to the data stored as a CLOB, and wherein the dynamic SQL response does not include the one or more data references.

17. The method of claim 10, wherein the memory stores additional computer-readable instructions that, when executed by the at least one processor, cause the computing platform to:
identify whether or not the data already includes the file wrapper, wherein generating the file wrapper is in response to identifying that the data does not already include the file wrapper.

18. One or more non-transitory computer-readable media storing instructions that, when executed by a computing platform comprising at least one processor, a communication interface, and memory, cause the computing platform to:
receive, from a user device, a query comprising a request for data stored as a character large object (CLOB);
obtain, from a data storage system, the data stored as a CLOB;
generate a file wrapper for the data, wherein generating the file wrapper comprises converting the CLOB to a variable character field (VARCHAR) object and storing the VARCHAR object in the file wrapper;
generate, using the VARCHAR object stored in the file wrapper, a dynamic structured query language (SQL) response to the query, wherein the file wrapper comprises a first data size, the CLOB comprises a second data size, and the VARCHAR object comprises a third data size, and wherein the first data size is equal to a difference between the second data size and the third data size;
execute the dynamic SQL response to generate a response to the query; and
send, to the user device, the response to the query and one or more commands directing the user device to display the response to the query, wherein sending the one or more commands directing the user device to display the response to the query causes the user device to display the response to the query.

19. The one or more non-transitory computer-readable media of claim 18, wherein the dynamic SQL response includes a reference to the VARCHAR object.

20. The one or more non-transitory computer-readable media of claim 18, wherein obtaining the data comprises obtaining data stored across multiple tables.

* * * * *